May 2, 1944. G. L. DIMMICK 2,347,938
SOUND FILM PRINTER
Filed Feb. 23, 1940

Inventor
Glenn L. Dimmick
Attorney

Patented May 2, 1944

2,347,938

UNITED STATES PATENT OFFICE 2,347,938

SOUND FILM PRINTER

Glenn L. Dimmick, Haddonfield, N. J., assignor to Radio Corporation of America, a corporation of Delaware Application February 23, 1940, Serial No. 320,239

4 Claims. (Cl. 88—24)

This invention relates to sound film printers and more particularly to projection printers for the optical printing of photographic sound records which may be printed the same size, enlarged or reduced. More particularly, the invention pertains to a novel optical system by which a double image may be produced with a very slight offset in the two parts of the image for the purpose of reducing background noise.

It is not unusual for small particles of dust or other foreign material to be present on sound film negatives. Likewise, in some instances there may be very small flaws in the emulsion, such as minute scratches. When such a film is printed on a projection printer, these flaws or particles are sharply imaged on the print and produce a corresponding amount of noise when the sound is reproduced therefrom. I have discovered that if a thin piece of birefringent crystal is placed in the path of light between the negative and positive and is so oriented that the two images adduced are displaced laterally of the film by an amount of the same order of magnitude as the size of a dust particle, an improved print is produced in which the noise from the foregoing causes may be reduced to as little as 2 percent of that which would otherwise occur from the same causes.

One object of the invention is to provide an improved apparatus for the projection printing of sound films.

Another object of the invention is to provide an apparatus for printing sound films in which two images of equal intensity will be produced very slightly displaced laterally from one another.

Another object of the invention is to provide an improved method of printing sound films in which two laterally displaced images are produced with such relation between their densities as to produce a minimum of noise.

Another object of the invention is to provide an improved method for printing variable area sound films with a reduction in the width of the bias line at zero amplitude.

Figure 1A:
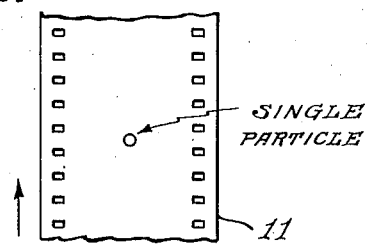
Figure 2A:
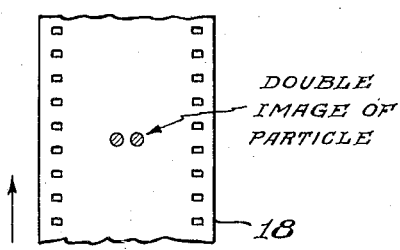
Figure 1B:
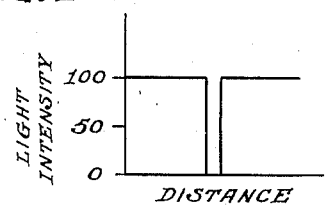
Figure 2B:
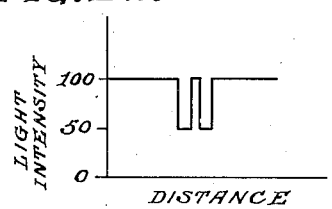
Figure 3:
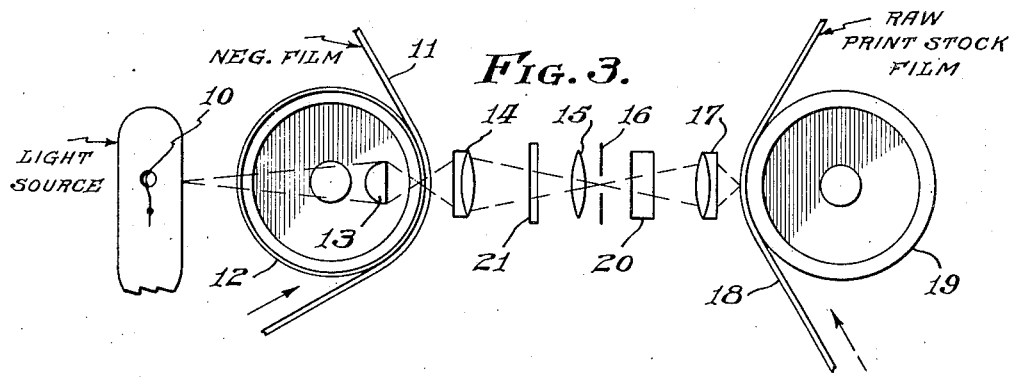
Figure 4:
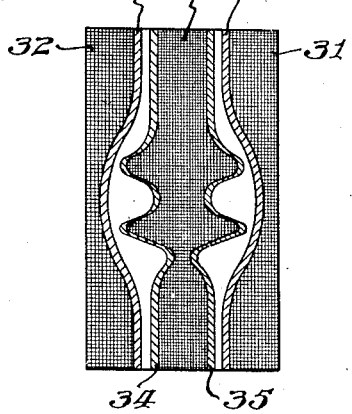
Figure 5:
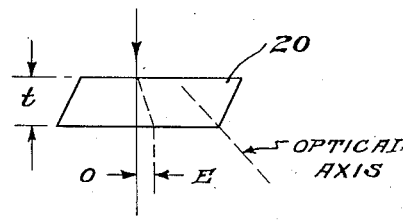

Other and incidental objects of the invention will be apparent to those skilled in the art from a reading of the following specification and an inspection of the accompanying drawing in which Figure 1a is a view of the film showing a single particle thereon, Figure 2a shows an image of the film as produced through a birefringent crystal where a double image of the particle is produced, each image having half the density of the single image in Fig. 1a, Figure 1b shows the relation between light intensity and distance in a film such as shown in Fig. 1a, and Figure 2b shows the relation between the light intensity and distance in the image produced as shown in Fig. 2a, Figure 3 is a side elevation of an optical printer constructed in accordance with my invention, Figure 4 is an elevation of a small portion of sound track as produced in the printer of Fig. 3, and Figure 5 is a detail of the birefringent crystal as used in the printer of Fig. 3.

Referring first to Fig. 1a showing a film, a single dust particle is indicated which is assumed to be completely opaque. The effect of such a dust particle on the light transmitted is as shown in Fig. 1b. If the light transmitted by the film is taken as 100 percent, at the margin of the dust particle the light transmitted falls sharply to zero, again arising to full transmission at the opposite edge of the dust particle. If any image of the film of Fig. 1a is produced and a birefringent crystal is introduced into the path of the image-forming apparatus, the said crystal having such a thickness as to shift the image of the particle laterally a little more than its own diameter, then an image such as shown in Fig. 2a is produced. It will be apparent that two images spaced by the amount of shifting produced by the crystal are produced. The intensity of these images is as shown in Fig. 2b, each image having a light intensity half that of the light transmitted by the clear portion of the film. If such an image is directed upon a piece of positive film stock which is thereafter developed in the usual fashion, the density of the images will be dependent upon the amount of exposure on each. If, for example, the light transmitted through the clear part of the negative produces a negative of 1.45 on the print at a gamma of 1.5, then the opaque particle shown in Fig. 1a would print to a density of zero. On the other hand, the double images of the particle shown in Fig. 2a would print to a density of 1.0. If the noise energy resulting from the reproduction of the track printed from Fig. 1a is represented as 100 percent, then the noise energy resulting from the reproduction of a track printed from the images shown in Fig. 2a would be only 2 percent or a noise energy reduction of 50 to 1.

Fig. 5 indicates how calcite breaks up an incident light ray into two rays O and E of equal intensity, but polarized in different directions. The ray O passes straight through the crystal 20 without deviation or shifting. The ray E is shifted laterally but emerges from the crystal parallel to the ray O, and a double image is produced which is shifted a corresponding amount laterally. There are many crystalline materials having the property of such double refraction and any one of these materials may be used provided it does not show too high an absorption. The amount of deviation depends upon the material and the thickness of the crystal. For calcite, referred to above, if a crystal has a thickness T, the deviation D equals $$\frac{T}{9.14}$$

Quartz may be used instead of calcite, as it also has a very high transmission, and for quartz the deviation equals $$\frac{T}{174.5}$$

Calcite and quartz are particularly desirable for use in this purpose, as both have a high transmission, not only in the visible but also in the ultra violet spectrum.

In the optical printer of Fig. 3, light from the source 10 is condensed on the film 11 carried by the drum 12 and by the condenser lens 13. Light passing through negative film 11 is imaged upon the limiting aperture 16 by the objective 14. The condenser lens 15 forms an image of the objective 14 upon the objective 17 which in turn re-images the sound track of the negative film 11 on the raw print stock 18 carried on the drum 19. The double refracting plate 20 is placed at some convenient place in the optical path as, for example, in the position indicated. The position of the plate 20 is not critical, since it does not change the angle of the light passing through it and it produces exactly the same lateral shift of the image irrespective of its position. It is necessary, of course, that the plate be so oriented that the deviation is perpendicular to the plane of the paper. The birefringent plate does not affect the resolving power of the system in the direction of film motion. Whenever it is desirable to use ultra violet light in printing, an appropriate filter 21 may be inserted at any appropriate point in the system, such as in the location indicated, or it may be immediately adjacent the plate 20.

Figure 4 illustrates a standard bilateral print made on the printer shown in Fig. 3. The dark areas 30, 31 and 32 have a density, for example, of 1.45. A narrow band along each edge, as at 33, 34, 35 and 36, would have a density of about 1.0. The width of each of these bands is equal to the separation distance between the double images in the film, as produced by the plate 20. This distance may be of the order of 1 mil (.001 inch) in the case of variable area sound tracks, since the dirt particles or scratches rarely exceed this dimension. In the case of variable density sound tracks, the shift may be made considerably greater than in the case of variable area sound tracks. The limiting condition in the variable area sound track is the closing of the clear margin space, such as between the lines 33 and 34. This space is commercially something of the order of 2 or 3 mils, and it should not be less than about 1 mil, or diffusion of the image may cause distortion.

If a variable area recording happened to be made with too wide a bias line, i. e., the clear space between the edges 33 and 34 or 35 and 36, there was heretofore no way of correcting the difficulty and the ground noise due to the wide bias line would necessarily follow through in all prints or recordings made from the negative. According to my improved process, however, a print may be made from the negative as described above with the two images shifted by the amount it is wished to reduce the bias line and a duplicate negative may be printed therefrom with a bias line of the proper width. Likewise, if an enlarged print is to be made from the sound track, as for example, if it is desired to enlarge the width of the track two to one, so that one half of the track may be reproduced in a conventional reproducer, the images may be shifted in the same ratio so that the printed bias lines are the same width as in the original negative or it may even be reduced in width as described above. The amount of shift accomplished is determined by varying the thickness of the crystal 20, and a crystal of the thickness to produce the desired shift may be inserted or a pair of wedge-shaped crystals having similar orientation of their crystal axes and similar angles may be used and shifted in relation to each other so as to produce the proper total thickness.

In the variable density tracks, however, there is no limiting condition in the track itself, such as the bias line, and the only limiting factor is that the shifted image should not be moved so far as to leave only the unshifted image under any portion of the scanning beam. The customary commercial dimensions of the sound track permit a shift of the order of 10 or 15 mils in the case of variable density recording.

The above figures on print density are of the same order as those ordinarily used in contact printing. In projection printing, however, the apparent density of the negative is increased, and it is accordingly possible to print to a higher density. In order to secure the optimum effect from this improved apparatus, it is desirable that the print be made to a high density and a low gamma. This may be accomplished by printing with ultra violet light, as the exposure by ultra violet light tends to produce a low gamma.

It is desirable that the print density be more than the gamma value times .3 and, as pointed out above, the higher the density and the lower the gamma beyond this value, the better the results that will be produced. For example, if negative sound track density is 2.0 and the print is printed to a density of 2.0 with ultra violet light, and the print gamma with ultra violet light is 1.5 corresponding to a picture print gamma with white light of 2.2, then the density of the double image of a dust spot on the negative will have a density of 1.55 and the reduction in the amplitude of the sound produced by the dust spot will be approximately 28 to 1.

In the printing of variable density sound records, the permissible range of densities is much reduced by the type of record. The ground noise reduction bias is, of course, applied to the density of the record in this case, instead of to the area of the record, as in the case of the variable area records. In this case, the biased print density should be of the order of 1.1, while the gamma printed with ultra violet light should be of the order of 1.5. This will give a spot density for the double spots of .65 and reduction in amplitude of the noise to spots of 4.5 to 1.

It will be apparent from the foregoing specification that the invention involves not only an improved projection printer for the printing of sound tracks, but an improved method of making such prints by so controlling the gamma and density as to secure the most desirable noise reduction effects.

I claim as my invention:

1. A printer for sound films including means for locating and illuminating a sound record film, means for locating raw film stock, and means for imaging the sound record film on the film stock comprising a single plane parallel birefringent crystal disposed in the path of the imaging ray for producing on said film stock a plurality of substantially superposed images of the sound record which are of equal intensity and are slightly displaced laterally with respect to one another.

2. A printer for sound films including means for locating a negative film, means for illuminating the negative film, means for locating a positive film stock, and means for imaging the negative film on the film stock comprising a single plane parallel birefringent crystal disposed in the path of the imaging ray for producing on said film stock a plurality of substantially superposed images of the sound record of equal intensity and slightly relatively displaced laterally of the sound track.

3. A printer for sound films including means for locating a negative film, means for illuminating the negative film, means for locating a positive film stock, and means for imaging the negative film on the positive film stock, said last-mentioned means comprising a birefringent crystal disposed in the path of the imaging ray for producing on said film stock a plurality of images of the sound record of equal intensity and slightly displaced with respect to one another.

4. A printer for sound films including means for locating a negative film, means for illuminating said negative film, means for locating a positive film stock, and means for imaging the negative film on the positive film stock, said last-mentioned means comprising a birefringent crystal disposed in the path of the imaging ray for producing on said positive film stock a plurality of images of the sound record of equal intensity and slightly relatively displaced with respect to one another.

GLENN L. DIMMICK.